United States Patent
Chen

(10) Patent No.: US 9,448,618 B2
(45) Date of Patent: Sep. 20, 2016

(54) START-UP MODULE OF REDUNDANT POWER SUPPLY HAVING SYNCHRONOUS AND SEQUENTIAL BOOTING MODES

(71) Applicant: ZIPPY TECHNOLOGY CORP., New Taipei (TW)

(72) Inventor: Tsung-Chun Chen, New Taipei (TW)

(73) Assignee: ZIPPY TECHNOLOGY CORP., New Taipei (TW)

( * ) Notice: Subject to any disclaimer, the term of this patent is extended or adjusted under 35 U.S.C. 154(b) by 218 days.

(21) Appl. No.: 14/293,701

(22) Filed: Jun. 2, 2014

(65) Prior Publication Data

US 2015/0346808 A1 Dec. 3, 2015

(51) Int. Cl.
*G06F 9/00* (2006.01)
*G06F 15/177* (2006.01)
*G06F 1/32* (2006.01)
*G06F 9/44* (2006.01)

(52) U.S. Cl.
CPC ........... *G06F 1/3293* (2013.01); *G06F 1/3296* (2013.01); *G06F 9/4401* (2013.01)

(58) Field of Classification Search
CPC ....................................................... G06F 9/44
See application file for complete search history.

(56) References Cited

U.S. PATENT DOCUMENTS

| | | | | |
|---|---|---|---|---|
| 6,815,938 B2* | 11/2004 | Horimoto | ............... | H02M 1/36 323/282 |
| 2006/0155837 A1* | 7/2006 | Kobayashi | .......... | H04L 67/1097 709/223 |
| 2009/0317086 A1* | 12/2009 | Morohashi | ............. | H04B 10/40 398/135 |
| 2010/0231363 A1* | 9/2010 | Knibbe | ............... | H04L 12/2803 340/286.02 |
| 2012/0042177 A1* | 2/2012 | Kong | ......................... | G06F 1/26 713/300 |
| 2012/0159139 A1* | 6/2012 | Kim | .................. | H04M 1/72563 713/2 |
| 2012/0166997 A1* | 6/2012 | Cho | ..................... | G06F 21/6218 715/778 |
| 2013/0110298 A1* | 5/2013 | Beveridge | ............... | F01K 13/02 700/287 |
| 2013/0162048 A1* | 6/2013 | Kim | ........................ | H02J 1/102 307/82 |

* cited by examiner

*Primary Examiner* — Mohammed Rehman
(74) *Attorney, Agent, or Firm* — Muncy, Geissler, Olds & Lowe, P.C.

(57) ABSTRACT

A start-up architecture of a redundant power supply system is provided. The redundant power supply system is electrically connected to a load, and includes N+M power supplies, where N≥1 and M≥1. The start-up architecture includes a power integration backboard electrically connected to the power supplies, and a mode switching member. The power integration backboard includes an activation circuit, and has a synchronous booting mode in which the power supplies are simultaneously activated and a sequential booting mode in which the power supplies are sequentially activated. The mode switching member is electrically connected to the activation circuit, and receives a manual switching of a user to output a synchronous booting signal that controls the power integration backboard to enter the synchronous booting mode and to output a sequential booting signal that controls the power integration backboard to enter the sequential booting mode.

8 Claims, 4 Drawing Sheets

START-UP MODULE OF REDUNDANT POWER SUPPLY HAVING SYNCHRONOUS AND SEQUENTIAL BOOTING MODES

FIELD OF THE INVENTION

The present invention relates to a redundant power supply system, and particularly to a start-up architecture of a redundant power supply system that prevents an electric tripping caused by an excessive start-up surge current.

BACKGROUND OF THE INVENTION

To satisfy requirements on the power supply stability for modern technologies, manufacturers and developers of the technical field have brought forward a redundant power supply system. The redundant power supply system mainly includes N+M power supplies, and a power integration backboard that integrates output powers of the power supplies and accordingly powers a load, where $N \geq 1$ and $M \geq 1$. As the load operates, the power integration backboard determines an output power of each of the power supplies according to a power consumption status of the load. When one of the power supplies is damaged and becomes incapable of normally supplying power, the power integration backboard again adjusts the output powers of the power supplies to maintain a normal power supply source.

In a current redundant power supply system, all of the power supplies in the redundant power supply system are simultaneously activated when the redundant power supply system is activated. When the redundant power supply system is applied to a load with a power consumption of about 2000 W, a start-up surge current generated by the power supplies is likely to cause an automatic tripping of a no fuse breaker in a power grid as the no fuse breaker cannot withstand an excessive start-up surge current. As such, an electric connection between the power grid and the redundant power supply system is disconnected, and the redundant power supply system cannot be normally activated. Further, in another type of redundant power supply system proposed for solving the above issue, a large-scale change in a circuit layout of the redundant power supply system needs to be made or a load connected requires corresponding adjustments. As a result, an overall structure may be too complicated to be extensively applied to all types of redundant power supply systems.

SUMMARY OF THE INVENTION

Therefore the primary object of the present invention is to overcome an issue of an electric tripping of a no fuse breaker that cannot withstand an excessive start-up surge current during a start-up procedure of a redundant power supply system.

To achieve the above object, a start-up architecture of a redundant power supply system is provided. The redundant power supply system is electrically connected to a load and comprising N+M power supplies, where $N \geq 1$ and $M \geq 1$. The start-up architecture includes a power integration backboard and a mode switching member. The power integration backboard is electrically connected to each of the N+M power supplies, and includes an activation circuit. The power integration backboard further has a synchronous booting mode and a sequential booting mode. In the synchronous booting mode, the N+M power supplies are simultaneously activated when the activation circuit receives a power supply on (Ps_on) signal outputted by the load. In the sequential booting mode, the N+M power supplies are sequentially activated when the activation circuit receives the Ps_on signal outputted by the load. The mode switching member, electrically connected to the activation circuit, receives a manual switching from a user to output a synchronous booting signal for controlling the power integration backboard to enter the synchronous booting mode, and a sequential booting signal for controlling the power integration backboard to enter the sequential booting mode.

In one embodiment, the redundant power supply system includes a casing. The mode switching member is mounted on the casing and is electrically connected to the activation circuit.

In one embodiment, the mode switching member is selected from a group consisting of a button switch, a rocker switch and a sliding switch.

In one embodiment, the power integration backboard sequentially activates the N+M power supplies in the sequential booting mode according to a buffer period.

In one embodiment, the power integration backboard includes a control unit. The control unit, electrically connected to the activation circuit, receives the Ps_on signal, the sequential booting signal and the synchronous booting signal, and accordingly determines whether to control the redundant power supply system to enter the synchronous booting mode or the sequential booting mode.

In one embodiment, the control unit outputs a start-up signal to each of the N+M power supplies for activating.

In one embodiment, the mode switching member includes a first conducting pin and a second conducting pin. The first conducting pin outputs the synchronous booting signal when being conducted. The second conducting pin outputs the sequential booting signal when being conducted.

In one embodiment, the mode switching member is disposed on the power integration backboard.

With the above structure, the present invention offers the following features compared to the prior art.

First of all, the power integration backboard of the present invention includes the synchronous booting mode and the sequential booting mode, and at the same time offers a user with a manual switching function, thereby preventing the issue of an electric tripping of a no fuse breaker during a start-up of the redundant power supply system.

Secondly, with the mode switching member of the present invention, the issue of making a large-scale change to a circuit layout or an over-complex structure caused by an excessive start-up surge current in a conventional redundant power supply system is solved.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
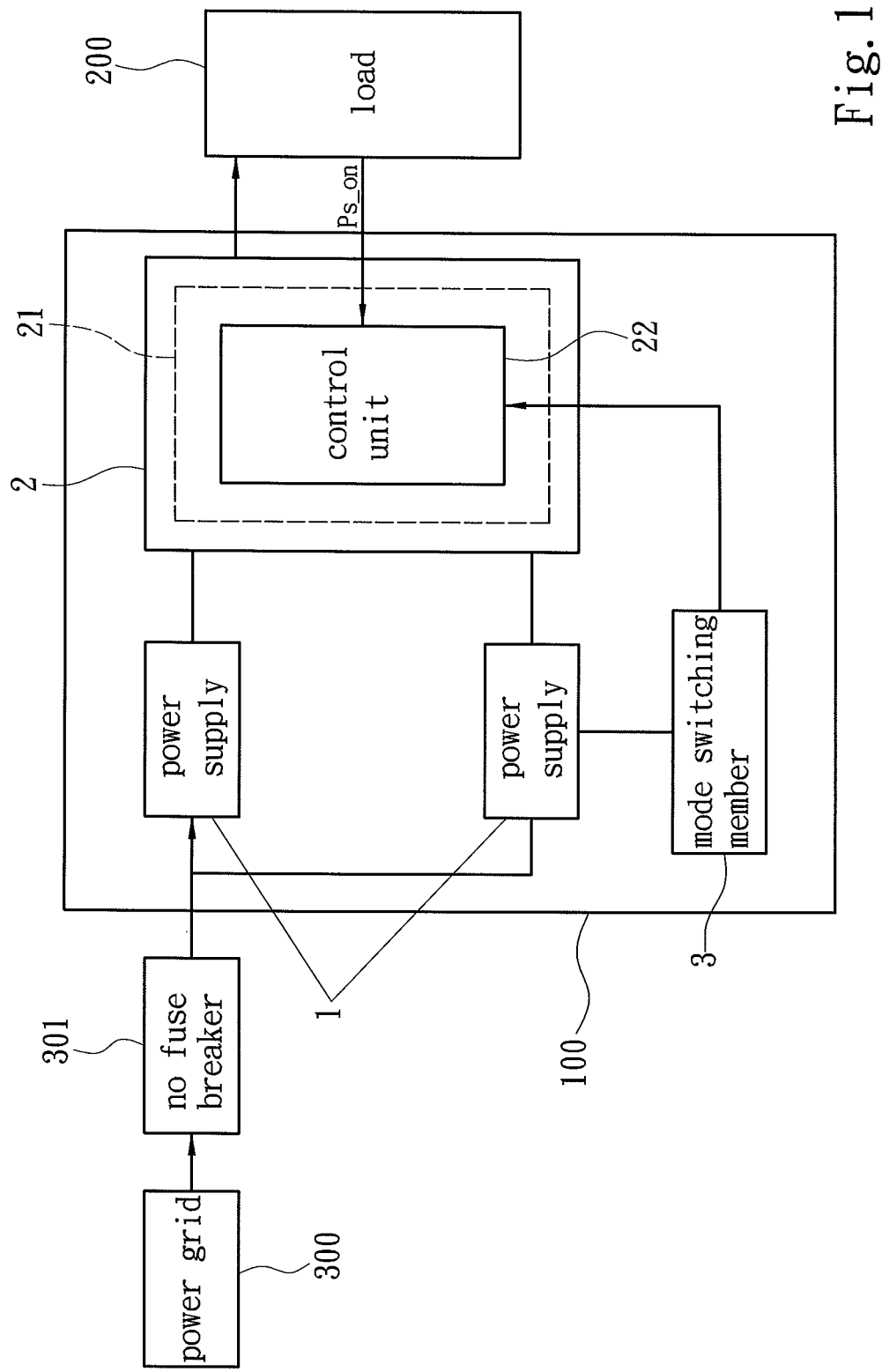
FIG. 1 is a schematic diagram of electric units according to an embodiment of the present invention.
Figure 2:
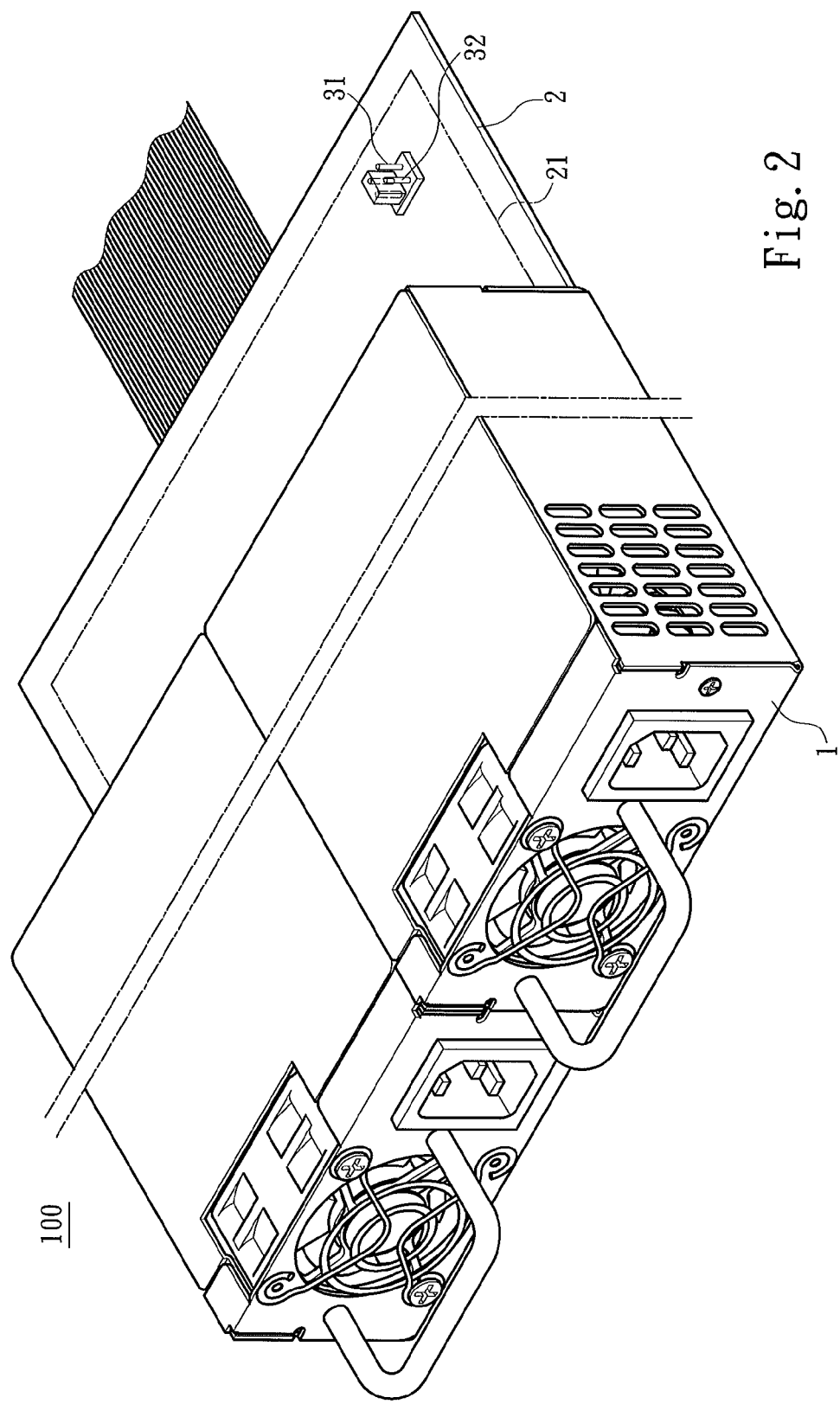
FIG. 2 is a schematic diagram of a structure according to an embodiment of the present invention.

The present invention discloses a start-up architecture of a redundant power supply system. Referring to FIG. 1 and FIG. 2, a redundant power supply system 100 is electrically connected to a load 200, and provides the load 200 with an operating power for powering operations of the load 200. For example, the load 200 is an electronic product such as a motherboard or a server. The load 200 outputs a power supply on (Ps_on) signal when being powered up and activated. The redundant power supply system 100, also referred to as a fault tolerant power supply, includes N+M power supplies 1, where N≥1 and M≥1. During a powering process, when one of the power supplies 1 is erroneous or damaged, the power supplied can be continuously provided by the other power supplies 1 to ensure the stability of the power supplied. The start-up architecture of the present invention includes a power integration backboard 2 and a mode switching member 3. The power integration backboard 2 is electrically connected to the N+M power supplies 1, and includes an activation circuit 21. The power integration backboard 2 is configured to distribute and integrate output powers of the N+M power supplies 1, and to modulate a single power level outputted by each of the N+M power supplies 1 to a power level required by the operations of the load 200. In the present invention, the power integration backboard 2 receives the Ps_on signal from the load 200 before providing power, and has a synchronous booting mode and a sequential booting mode. More specifically, in the synchronous booting mode, on the basis of a synchronous booting signal received by the activation circuit 21, the power supplies 1 are simultaneously activated when the power integration backboard 2 receives the Ps_on signal outputted by the load 200. Further, the power integration backboard 2 includes a control unit 22. The control unit 22, electrically connected to the activation circuit 21, receives the sequential booting signal, the synchronous booting signal and the Ps_on signal to determine a booting mode of the redundant power supply system 100. For example, the control unit 22 is a microprocessor. In the synchronous booting mode or the sequential booting mode, the control unit 22 outputs the start-up signal to the power supplies 1. The start-up signal is in fact a trigger signal that triggers the power supplies 1 to activate. Further, in the sequential booting mode, the power integration backboard 2 of the present invention may sequentially activate the power supplies according to a buffer period. More specifically, via the control unit 22, the power integration backboard 2 periodically outputs the start-up signal at an interval of a buffer period to the power supplies 1 of the redundant power supply system 100 to sequentially activate the power supplies 1.

In one embodiment of the present invention, the mode switching member 3 may be mounted on a casing 101 of the redundant power supply system 100. The mode switching member 3 is manually switched and controlled by a user to output the synchronous booting signal or the sequential booting signal. A power level of the sequential booting signal is different from a power level of the synchronous booting signal. Further, the mode switching member 3 in an embodiment may be selected from a group consisting of a button switch, a rocker switch and a sliding switch. In another embodiment of the present invention, the mode switching member 3 may also be implemented in form of a pin. That is to say, the mode switching member 3 may include a first conducting pin 31, which outputs the synchronous booting signal when being conducted, and a second conducting pin 32, which outputs the sequential booting signal when being conducted. The first conducting pin 31 and the second conducting pin 32 are electrically connected to the activation circuit 21. Furthermore, an electric signal generated by the conducted first conducting pin 31 is different from an electric signal generated by the conducted second conducting pin 32. Alternatively, the first conducting pin 31 and the second conducting pin 32 are connected to the activation circuit 21 via an electric loop, and the activation circuit 21 determines whether a signal received is the sequential booting signal or the synchronous booting signal. Furthermore, the mode switching member 3 is disposed on the power integration backboard 2.

Figure 3:
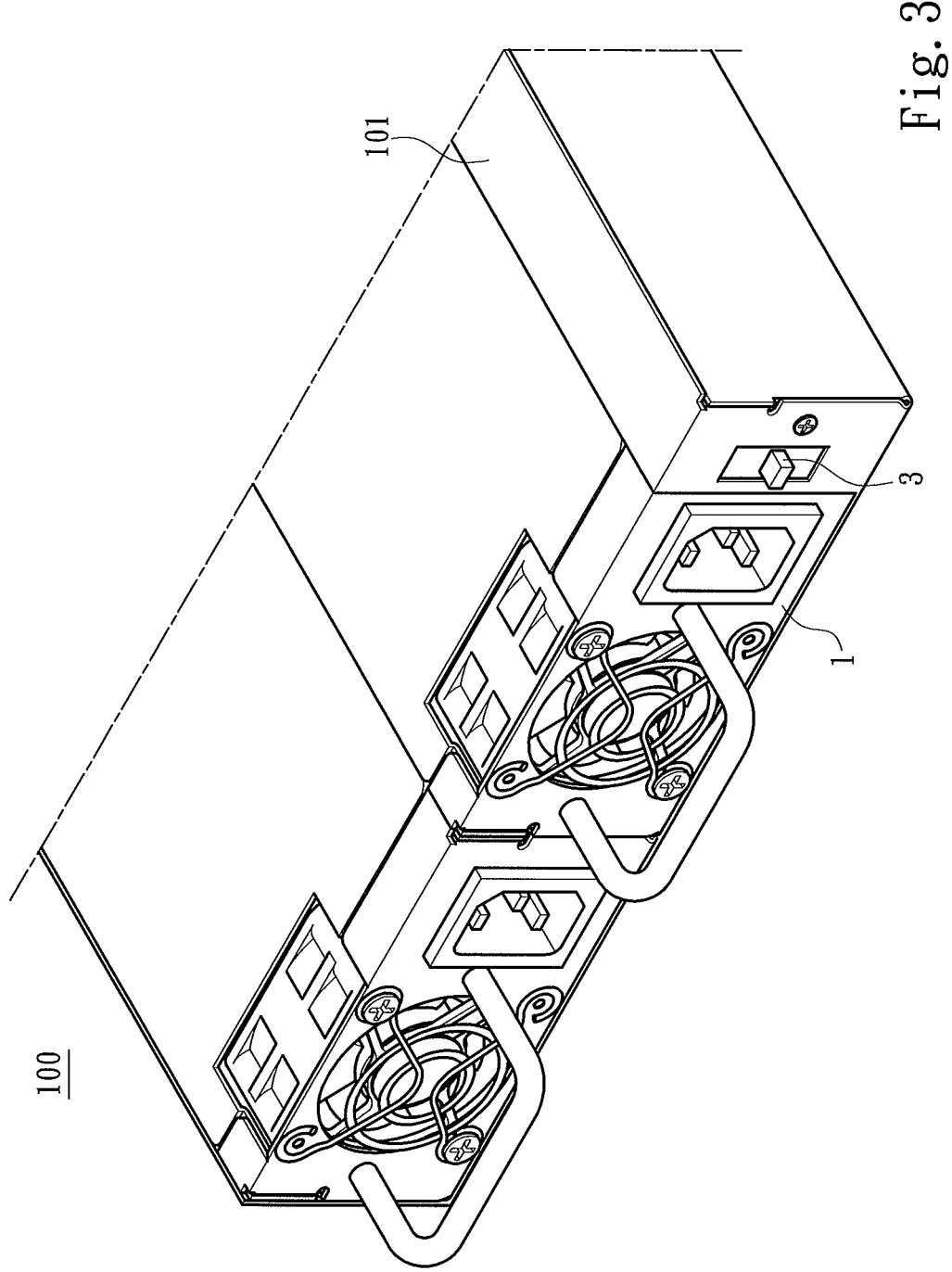
FIG. 3 is a schematic diagram of a structure according to another embodiment of the present invention.
Figure 4:
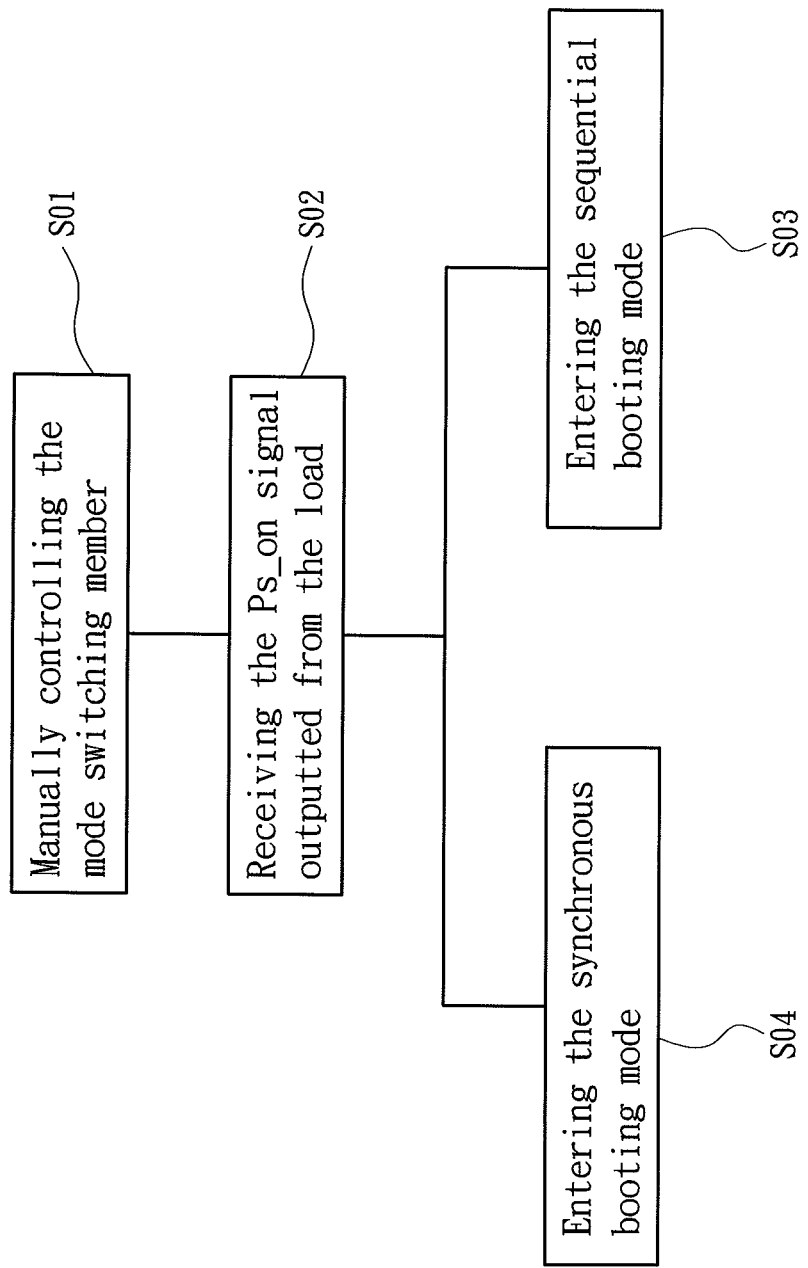
FIG. 4 is a flowchart of a process according to an embodiment of the present invention.

Referring to FIG. 4, when the redundant power supply system 100 of the present invention is not yet activated, a user may manually control the mode switching member 3 to generate the sequential booting signal or the synchronous booting signal with reference to a rated current of a no fuse breaker 301 disposed on a power grid 300. More specifically, when the rated current is capable of withstanding a start-up surge current that the redundant power supply system 100 generates during the start-up procedure, the mode switching member 3 is rendered to output the synchronous booting signal, such that the power integration backboard 2 enters the synchronous booting mode upon receiving the Ps_on signal outputted from the load 200. When the rated current of the no fuse breaker 301 is incapable of withstanding the start-up surge current that the redundant power supply system 100 generates during the start-up procedure, the mode switching member 3 is rendered to output the sequential booting signal, such that the power integration backboard 2 enters the sequential booting mode upon receiving the Ps_on signal outputted from the load 200 (as shown by step S01 in FIG. 3). A situation of assuming that the mode switching member 3 outputs the sequential booting signal according to the manual control of the user is given below. When the load 200 is activated and outputs the Ps_on signal to the redundant power supply system 100 (as shown by step S02 in FIG. 3), the power integration backboard 2 receives the Ps_on signal, and enters the sequential booting mode in response to the sequential booting signal. At this point, the power integration backboard 2 utilizes the control unit 22 to send the start-up signal to one of the power supplies 1 that is not yet powered on at an interval of a buffer period, so as to start-up the power supply 1 that receives the start-up signal, until all of the power supplies 1 of the redundant power supply system 100 are activated (as shown by step S03 in FIG. 3). In contrast, when the mode switching member 3 outputs the synchronous booting signal according to the manual control of the user, the power integration backboard 2 utilizes the control unit 22 to simultaneously output the start-up signal to all of the power supplies 1, such that all of the power supplies 1 are simultaneously activated (as shown by step S04 in FIG. 3).

In conclusion, in the start-up architecture of a redundant power supply system of the present invention, the redundant power supply system is electrically connected to a load and includes N+M power supplies, where N≥1 and M≥1. The start-up architecture includes a power integration backboard electrically connected to the N+M power supplies and a mode switching member. The power integration backboard includes an activation circuit, and has a synchronous booting mode in which all of the power supplies are simultaneously activated, and a sequential booting mode in which the power supplies are sequentially activated. The mode switching member is electrically connected to the activation circuit, and receives a manual switching from a user to output a synchronous booting signal that controls the power integration backboard to enter the synchronous booting mode, and a sequential booting signal that controls the power integration backboard to enter the sequential booting mode. As such, the issue of an electric tripping of a no fuse breaker caused by an excessive start-up surge current during a start-up procedure of a conventional redundant power supply system can be eliminated.

What is claimed is:

1. A start-up architecture of a redundant power supply system, the redundant power supply system being electrically connected to a load and comprising N+M power supplies, where N≥1 and M≥1, the start-up architecture comprising:
   a power integration backboard, electrically connected to the N+M power supplies, comprising an activation circuit; and
   a mode switching member, electrically connected to the activation circuit, receiving a manual switching from a user to output a synchronous booting signal for controlling the power integration backboard to enter a synchronous booting mode and a sequential booting signal for controlling the power integration backboard to enter a sequential booting mode;
   wherein when the power integration backboard is in the synchronous booting mode, each of the N+M power supplies are simultaneously activated once the activation circuit receives a power supply on (Ps_on) signal outputted by the load; and when the rower integration backboard is in the sequential booting mode, each of the N+M power supplies are sequentially activated once the activation circuit receives the Ps_on signal outputted by the load.

2. The start-up architecture of claim 1, wherein the redundant power supply system comprises a casing, and the mode switching member is mounted on the casing and is electrically connected to the activation circuit.

3. The start-up architecture of claim 1, wherein the mode switching member is selected from a group consisting of a button switch, a rocker switch and a sliding switch.

4. The start-up architecture of claim 1, wherein the power integration backboard sequentially activates the N+M power supplies in the sequential booting mode according to a buffer period.

5. The start-up architecture of claim 1, wherein the power integration backboard comprises a control unit which is electrically connected to the activation circuit to receive the Ps_on signal, the sequential booting signal and the synchronous booting signal to determine whether to control the redundant power supply system to enter the synchronous booting mode or the sequential booting mode.

6. The start-up architecture of claim 5, wherein the control unit outputs a start-up signal to each of the N+M power supplies for activating.

7. The start-up architecture of claim 1, wherein the mode switching member comprises a first conducting pin that outputs the synchronous booting signal when being conducted, and a second conducting pin that outputs the sequential booting signal when being conducted.

8. The start-up architecture of claim 7, wherein the mode switching member is disposed on the power integration backboard.

* * * * *